United States Patent Office 2,937,185
Patented May 17, 1960

2,937,185
DIAMINO ALKANOLS AND ALKANONES

John H. Biel, Milwaukee, Wis., assignor, by mesne assignments, to Lakeside Laboratories, Inc., a corporation of Delaware No Drawing. Application August 13, 1956
Serial No. 603,803

2 Claims. (Cl. 260—326.5)

This invention relates to novel processes of producing chemical compounds and the novel compounds so produced.

It has been discovered according to the present invention that disubstituted amino alkynes of the formula

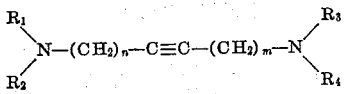

may be hydrated to disubstituted amino alkanones of the formula

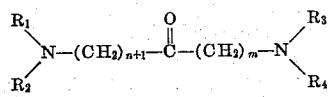

which in turn may be reduced to disubstituted amino alkanols of the formula

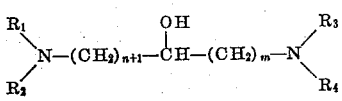

wherein, in each occurrence, $m$ is an integer greater than 0, $n$ is an integer greater than 1, and $R_1$, $R_2$, $R_3$ and $R_4$ are the same or different alkyl groups, preferably lower alkyls; aryl groups, preferably monocyclic aryl groups; aralkyl groups, preferably lower alkyl-monocyclic aryl groups; cycloalkyl groups, preferably of 6 carbons or less; alkenyl groups, preferably lower alkenyl groups; cycloalkyl-alkyl groups, preferably lower alkyl-monocyclic lower alkyl groups such as of 6 carbons or less; heterocyclic groups such as 2-furfuryl, 2-tetrahydrofurfuryl, 2-thienylmethyl and other heterocyclic groups preferably of 6 atoms or less in the ring; and groups where $R_1$ and $R_2$ and/or $R_3$ and $R_4$ are joined so that the nitrogen is part of a heterocyclic group such as piperidino, morpholino, pyrrolidino, 1,2,3,4-tetrahydroisoquinolino, 1,2,3,4-tetrahydroquinolino, isoindolino and 4-methyl-1-piperiazino. It is preferred that $m$ and $n$ each be 10 carbons or less.

The disubstituted amino alkynes used as starting materials may be symmetrical or unsymmetrical, i.e., the carbon to carbon unsaturation need not be centrally located. Both symmetrical and unsymmetrical disubstituted amino alkynes may be produced by reacting a metal salt of an appropriate teritary aminoalkyne with an appropriate tertiary aminoalkyl halide in an inert solvent as is more fully disclosed in my copending application, Serial No. 468,137, filed November 10, 1954, now Patent No. 2,830,048. Bis (N-disubstituted aminoalkyl) acetylenes of at least 6 carbons which may also be used as starting materials may be produced by reacting a dimetal acetylide with two moles of a teritary aminoalkyl halide as is more fully described in my copending application, Serial No. 579,162, filed April 19, 1956, now abandoned. Representative compounds which may be used as reactants are 1,6-bis(N-dimethylamino)-3-hexyne, 1,6-bis-pyrrolidino-3-hexyne, 1,6-bis morpholino-3-hexyne, 1,6-bis piperidino-3-hexyne and similar compounds in which the alkyne is symmetrically arranged, such as octynes, decynes and the like, 1,5-bis(N-dimethylamino)-2-pentyne, 1,5 - bis(N - diethylamino)-2-pentyne, 1,6-bis pyrrolidino-2-hexyne, 1,6-bis morpholino-2-hexyne, 1,6-bis(N-diisopropylamino)-2-hexyne, 1,6-bis (N-diethylamino)-2-hexyne, 1-(N-methylpropylamino)-8-morpholino - 2 - octyne, 1 - (N - diallylamino) - 10 - (N'-dimethylamino)-2-decyne, 1,6-bis(N-dicyclohexylamino)-3-hexyne, 1-(N-diphenylamino)-5-(N-dibenzylamino)-2-pentyne, and 1,6-bis[N-di(2-furfuryl)amino]-3-hexyne.

The first step of the overall reaction in which an alkyne is hydrated to the corresponding alkanol may be conveniently effected by contacting the alkyne with an aqueous or lower alcohol solution of a mineral acid such as sulfuric acid. Catalytic amounts of a mercury salt such as mercuric oxide or mercuric sulfate are added to the mixture to promote the hydration. Elevated temperatures such as the reflux temperature are preferred. After the reaction is terminated the diamino alkanone may be recovered from the reaction mixture by alkalizing it and then extracting with an inert immiscible solvent such as ether. The product is isolated by evaporation of the extracting solvent. If sufficiently stable it may be purified by fractional distillation.

The keto group introduced by the hydration will be located on either of the two carbons which formed the unsaturated bond. It cannot be predicted to which carbon the keto group will go, except in the case of completely symmetrical reactants, since the remaining part of the molecule exerts a directing influence which may shift its position of introduction from one carbon to the other between analogous compounds. Thus, 1,6-bis(N-diethylamino)-2-hexyne gives 1,6-bis(N-diethylamino)-3-hexanone while 1,6-bis(N-diethylamino)-3-hexyne also gives 1,6-bis(N-diethylamino)-3-hexanone. The position which the keto group takes is readily determined by those skilled in the art. With unsymmetrical alkynes there seems to be a tendency for the keto group to be located on the carbon of the alkyne bond most removed from the terminal carbons although this may vary. The fully symmetrical 1,6-bis(N-diethylamino)-3-hexyne gives 1,6-bis(N-diethylamino)-3-hexanone. Also, 1,6-bis(N-pyrrolidino)-3-hexyne yields 1,6-bis(N-pyrrolidino)-3-hexanone.

Conversion of these and other related alkanones to the corresponding alkanols may be effected by chemical or catalytic means. Lithium aluminum hydride and sodium borohydride are particularly suitable chemical reducing agents for this process. The reduction may be conveniently effected by contacting the alkanone with such reducing agents in the presence of an inert solvent such as anhydrous ether, dioxane, methanol and tetrahydrofuran. Moderately elevated temperatures such as up to 75° C. may be used to enhance reaction. The reaction is terminated usually in a few hours, water added to decompose excess reducing agent and the product recovered from the organic phase by conventional isolation methods such as fractional distillation. Catalytic reduction may be effected with catalysts such as palladium, platinum and the oxides thereof. A weakly acidic aqueous medium may be used for the reaction. Elevated temperatures and pressures should be used for the reduction.

Acid addition salts and quaternary ammonium salts of the alkanones and alkanols may be produced by conventional processes. Thus, by reacting one mole of an alkanone or alkanol with one or two equivalents of a mineral or organic acid, an acid addition salt may be produced. Hydrochloric acid, sulfuric acid, formic acid, acetic acid, citric acid, maleic acid and fumaric acid may be used to form the corresponding acid addition salts.

Quaternary ammonium salts are formed by contracting the alkanones and alkanols with alkyl and aralkyl esters of mineral and organic acids such as methyl bromide, o-chlorobenzyl iodide, methyl sulfate, benzyl chloride, propargyl bromide, alkyl iodide and the like, preferably in a suitable organic solvent.

The non-toxic acid addition salts of the alkanones and alkanols are useful diuretic agents whereas the non-toxic quaternary ammonium salts are potent and long-acting hypotensive agents.

The following examples are included to illustrate the preparation of representative compounds provided by this invention but it is to be understood that the invention shall not thereby be restricted to these embodiments.

EXAMPLE 1

1,6-bis(N-dimethylamino)-3-hexanone

To a mixture of 50 cc. of 50% sulfuric acid and 1 gm. of mercuric oxide at 60° C. was added 16.8 gm. (0.1 mole) of 1,6-bis(N-dimethylamino)-2-hexyne. The mixture was stirred at 60° C. for three hours. It was filtered, poured over ice and saturated with potassium hydroxide. It was extracted three times with 50 cc. portions of ethyl ether. After being dried over potassium carbonate, the combined ether extracts were vacuum distilled. The product was collected at 74–75° C./0.7 mm.; 10 gm., 54% yield.

Analysis.—Calcd. for $C_{10}H_{22}N_2O$: 15.04% N. Found: 14.91% N.

EXAMPLE 2

1,6-bis(N-dimethylamino)-3-hexanone

The procedure of Example 1 was followed to produce this compound from 1,6-bis(N-dimethylamino)-3-hexyne, B.P. 74–75° C./0.7 mm. The base was then reacted with two equivalents of methyl bromide in isopropyl alcohol to form the bis-methobromide salt; M.P. 255–310° C., yield 80%.

Assay.—Calcd.: 7.45% N, 7.45% CO, 42.59% Br. Found: 8.32% N, 47.58% Br.

EXAMPLE 3

1,6-bis(N-diethylamino)-3-hexanone 1,6-bis(N-diethylamino)-2-hexyne was hydrated as in Example 1 to give this compound.

The base was converted to the bis-hydrochloride salt; M.P. 168–169° C., yield 70%.

Assay.—Calcd.: 8.88% N, 8.88% CO, 22.53% Cl. Found: 8.66% N, 7.95% CO, 22.32% Cl.

EXAMPLE 4

1,6-bis(N-diethylamino)-3-hexanone 1,6-bis(N-diethylamino)-3-hexyne was hydrated as in Example 1 to give this compound. The bis-hydrochloride and bis-methobromide salts of the base when mixed with the corresponding salts of the compound produced in Example 3 gave no mixed melting point depression.

EXAMPLE 5

1,6-bis-pyrrolidino-3-hexanone 1,6-bis(N-pyrrolidino-3-hexyne was hydrated as in Example 1 to form this base. The bis-hydrochloride salt had a melting point of 176–177° C., yield 73%.

Assay.—Calcd.: 9.00% N, 9.00% CO, 22.82% Cl. Found: 8.82% N, 7.20% CO, 22.35% Cl.

EXAMPLE 6

1,6-bis(N-diethylamino)-3-hexanol

To 3.8 gm. of sodium borohydride in 100 cc. of methanol at 60° C. was added 47 gm. of 1,6-bis(N-diethylamino)-3-hexanone. The mixture was heated on a steam bath for 1 hour, poured over ice and acidified to pH 2–3 with concentrated hydrochloric acid. It was concentrated to dryness and the residue dissolved in 150 cc. of water. It was saturated with potassium hydroxide and extracted with three 100 cc. aliquots of ethyl ether. The ether extracts were dried over potassium carbonate and vacuum distilled; B.P. 102–104° C./0.3 mm.; 32 gm., 70% yield.

Analysis.—Calcd. for $C_{14}H_{32}N_2O$: 11.47% N. Found: 11.26% N.

The bis-methobromide salt was prepared and had a melting point of 226–228° C. and a 90% yield.

Assay.—Calcd.: 6:45% N, 36.86% Br. Found: 6.48% N, 36.76% Br.

The bis-hydrochloride salt was also prepared. It had a melting point of 176–177° C., yield 89%.

Assay.—Calcd.: 8.83% N, 22.39% Cl. Found: 8.79% N, 22.09% Cl.

EXAMPLE 7

1,6-bis(N-dimethylamino)-3-hexanol 1,6-bis(N-dimethylamino)-3-hexanone was reduced as in Example 6 to for the alcohol; B.P. 65–67° C./0.3 mm., yield 79%.

Assay.—Calcd.: 14.89% N. Found: 14.60% N.

The bis-methobromide salt had a melting point of 270–271° C., yield 92%.

Assay.—Calcd.: 7.41% N, 42.34% Br. Found: 7.57% N, 42.53% Br.

EXAMPLE 8

1,5-bis(N-dimethylamino)-3-pentanol

By reducing 1,5-bis(N-diethylamino)-2-pentanone as in Example 6 this compound was produced; B.P. 123–125° C./10 mm., 53% yield.

Assay.—Calcd.: 12.17% N. Found: 11.85% N.

The bis-methobromide salt had a melting point of 252–254° C., 60% yield.

Assay.—Calcd.: 6.66% N, 38.09% Br. Found: 6.72% N, 37.97% Br.

The bis-hydrochloride salt had a melting point of 201–202° C., yield 96%.

Assay.—Calcd.: 9.24% N, 23.43% Cl. Found: 9.26% N, 23.19% Cl.

EXAMPLE 9

1,6-bis-pyrrolidino-3-hexanol

By reducing 1,6-bis-pyrrolidino-3-hexanone as in Example 6 this compound was formed, B.P. 131–133° C./0.1 mm., yield 79%.

Assay.—Calcd.: 11.66% N. Found: 11.41% N.

The bis-methobromide salt had a melting point of 182–184° C., yield 94%.

Assay.—Calcd.: 6.51% N, 37.20 Br. Found: 6.41% N, 36.94% Br.

Various changes and modifications of the invention can be made and, to the extent that such variations incorporate the spirit of this invention, they are intended to be included within the scope of the appended claims.

What is claimed is:

1. The process which comprises reacting a compound of the formula

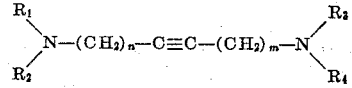

with a hydrating agent to produce a compound of the formula

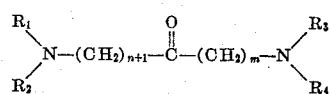

and contacting said compound with a reducing agent to produce a compound of the formula

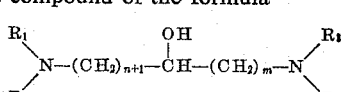

wherein $m$ and $n$ are integers other than zero but $n$ plus $m$ is at least 3 and not greater than 8, and $R_1$, $R_2$, $R_3$ and $R_4$ are members of the group consisting of phenyl, furfuryl, phenyl-lower alkyl, cyclohexyl, and lower alkenyl groups and the groups

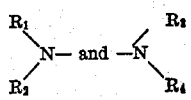

also represent heterocyclic groups of the group consisting of the piperidino, morpholino and pyrrolidino.

2. The process which comprises reacting 1,6-bis-pyrrolidino-3-hexyne with a hydrating agent to produce 1,6-bis-pyrrolidino-3-hexanone and contacting said ketone with a reducing agent to produce 1,6-bis-pyrrolidino-3-hexanol.

References Cited in the file of this patent

UNITED STATES PATENTS

| | | |
|---|---|---|
| 808,747 | Hoffman | Jan. 2, 1906 |
| 1,790,042 | Eisleb | Jan. 27, 1931 |
| 1,845,403 | Eisleb | Feb. 16, 1932 |
| 2,046,720 | Bottoms | July 17, 1936 |

OTHER REFERENCES

Gaylord: Reduction with Complex Metal Hydrides, 1956, pp. 124 and 283.

Morgenstern et al.: Chem. Abstracts, vol. 5, p. 1745 (1911).

Delaby: Chem. Abstracts, vol. 18, p. 70 (1924).

Copp: Chem. Abstracts, cols. 12051–52 (1954).